US010067730B2

(12) United States Patent
Handrigan et al.

(10) Patent No.: US 10,067,730 B2
(45) Date of Patent: *Sep. 4, 2018

(54) SYSTEMS AND METHODS FOR ENABLING REPLAY OF INTERNET CO-BROWSING

(71) Applicant: RECURSIVE LABS, INC., St. Louis, MO (US)

(72) Inventors: Brian David Handrigan, Wildwood, MO (US); Mark David Comiso, Cupertino, CA (US); Eldon Spencer Markowski, Fishers, IN (US); Bud Albers, Wildwood, MO (US); Daniel Alstadt, Maplewood, MO (US); David Wilcox, St. Louis, MO (US); Ryan Vincent, Fairview Heights, IL (US)

(73) Assignee: Recursive Labs, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,106

(22) Filed: Mar. 17, 2017

(65) Prior Publication Data

US 2017/0185368 A1    Jun. 29, 2017

Related U.S. Application Data

(63) Continuation-in-part of application No. 14/938,229, filed on Nov. 11, 2015, which is a continuation of (Continued)

(51) Int. Cl.
*G06F 3/14* (2006.01)
*G06F 9/54* (2006.01)
(Continued)

(52) U.S. Cl.
CPC ............ *G06F 3/1454* (2013.01); *G06F 9/542* (2013.01); *G06F 17/218* (2013.01);
(Continued)

(58) Field of Classification Search
CPC ...... G06F 3/1454; G06F 3/0484; G06F 3/048; G06F 17/30873; G06F 17/30899;
(Continued)

(56) References Cited

U.S. PATENT DOCUMENTS 6,070,185 A * 5/2000 Anupam ........... G06F 17/30873
707/E17.111
6,144,991 A * 11/2000 England ............ G06F 17/30873
707/E17.111
(Continued)

OTHER PUBLICATIONS

Yu B, Rui Y. Towards good web conferencing system design for ubi-media collaboration. InUbi-Media Computing, 2008 First IEEE International Conference on Jul. 31, 2008 (pp. 213-218). IEEE.*

*Primary Examiner* — Ranodhi Serrao
*Assistant Examiner* — James Fiorillo
(74) *Attorney, Agent, or Firm* — Polsinelli PC

(57) ABSTRACT

Systems and methods for enabling co-browsing are provided herein. A device, such as a web server, may execute a browser application that initiates co-browsing capabilities between a host computing device and one or more guest computing devices. Activatable code is injected and/or otherwise embedded in one or more web pages. Subsequently, using the activatable code, web browser information on the host computing device is obtained and processed for display on the one or more guest computing devices.

15 Claims, 10 Drawing Sheets

Related U.S. Application Data application No. 13/545,810, filed on Jul. 10, 2012, now Pat. No. 9,256,691.

(51) Int. Cl.
  *G06F 17/30* (2006.01)
  *G06F 17/22* (2006.01)
  *G06F 17/21* (2006.01)

(52) U.S. Cl.
  CPC ...... *G06F 17/2247* (2013.01); *G06F 17/3089* (2013.01); *G06F 17/30905* (2013.01)

(58) Field of Classification Search
  CPC ......... G06F 17/30861; G06F 17/30902; G06F 17/30867
  USPC .................................. 709/204, 205, 206, 218
  See application file for complete search history.

(56) References Cited

U.S. PATENT DOCUMENTS

| | | | | |
|---|---|---|---|---|
| 8,010,901 B1* | 8/2011 | Rogers | G06F 17/30873 | 709/204 |
| 9,117,002 B1* | 8/2015 | Jenkins | G06F 17/30899 | |
| 9,152,970 B1* | 10/2015 | Trahan | G06Q 30/02 | |
| 9,635,094 B2* | 4/2017 | Damale | H04L 67/22 | |
| 9,916,128 B2* | 3/2018 | Badger | G06F 3/167 | |
| 2002/0055973 A1* | 5/2002 | Low | G06Q 30/06 | 709/204 |
| 2008/0222295 A1* | 9/2008 | Robinson | G06F 17/30867 | 709/227 |
| 2009/0164581 A1* | 6/2009 | Bove | G06F 17/30873 | 709/205 |
| 2010/0082747 A1* | 4/2010 | Yue | G06F 17/30873 | 709/204 |
| 2010/0083135 A1* | 4/2010 | Zawacki | G06F 17/30873 | 715/753 |
| 2010/0218105 A1* | 8/2010 | Perov | G06F 17/30873 | 715/738 |
| 2010/0293190 A1* | 11/2010 | Kaiser | G06F 3/048 | 707/769 |
| 2010/0306642 A1* | 12/2010 | Lowet | G06F 17/30873 | 715/234 |
| 2011/0119352 A1* | 5/2011 | Perov | G06F 17/30873 | 709/218 |
| 2011/0119571 A1* | 5/2011 | Decker | G06F 17/30902 | 715/205 |
| 2011/0126130 A1* | 5/2011 | Lieb | G06F 3/1454 | 715/753 |
| 2011/0191676 A1* | 8/2011 | Guttman | G06F 3/00 | 715/716 |
| 2012/0159356 A1* | 6/2012 | Steelberg | G06F 17/30861 | 715/760 |
| 2012/0174121 A1* | 7/2012 | Treat | G06F 9/542 | 719/318 |
| 2013/0086487 A1* | 4/2013 | Findlay | H04N 7/15 | 715/753 |
| 2013/0136253 A1* | 5/2013 | Liberman Ben-Ami | H04M 3/5191 | 379/265.09 |
| 2013/0159414 A1* | 6/2013 | Zhou | H04L 65/403 | 709/204 |
| 2013/0167249 A1* | 6/2013 | Birtwhistle | G06Q 10/10 | 726/28 |
| 2014/0098176 A1* | 4/2014 | Isaacs | H04W 4/60 | 348/14.01 |
| 2014/0101261 A1* | 4/2014 | Wu | G06Q 10/107 | 709/206 |
| 2014/0108542 A1* | 4/2014 | Cheng | H04L 65/403 | 709/204 |
| 2014/0108558 A1* | 4/2014 | Borzycki | G06F 21/6218 | 709/205 |
| 2014/0164934 A1* | 6/2014 | Yang | G06F 17/3089 | 715/738 |
| 2015/0039694 A1* | 2/2015 | Yoon | H04L 12/1813 | 709/204 |
| 2015/0113409 A1* | 4/2015 | Badger | H04M 3/5191 | 715/728 |
| 2015/0149558 A1* | 5/2015 | Mendez | G06F 17/30873 | 709/205 |
| 2015/0346937 A1* | 12/2015 | Mahmoudian-Bidgoly | G06F 3/0484 | 715/753 |
| 2015/0355825 A1* | 12/2015 | Bhogal | G06F 3/0484 | 715/720 |
| 2015/0373081 A1* | 12/2015 | Laga | H04L 51/046 | 709/203 |
| 2015/0378577 A1* | 12/2015 | Lum | G06Q 10/10 | 715/720 |
| 2016/0044115 A1* | 2/2016 | Hill | H04L 67/04 | 709/227 |
| 2017/0097997 A1* | 4/2017 | Moyers | G06F 17/30864 | |
| 2017/0220582 A1* | 8/2017 | McCann | G06F 17/3053 | |

\* cited by examiner

SYSTEMS AND METHODS FOR ENABLING REPLAY OF INTERNET CO-BROWSING

CROSS REFERENCE TO RELATED APPLICATIONS

This application is a continuation-in-part of application Ser. No. 14/938,229, filed on Nov. 11, 2015, which is a continuation of application Ser. No. 13/545,810, filed on Jul. 10, 2012, which is now U.S. Pat. No. 9,256,651.

TECHNICAL FIELD

Aspects of the present disclosure relate to web browsing, and more particularly, systems and methods for enabling multiple users to share a web-browsing experience.

BACKGROUND

Collaborative browsing, known as co-browsing, represents the joint navigation of web-related content by two or more people accessing one or more web pages at the same time. Co-browsing has many practical applications and may be used in a variety of different types of communications, such as in customer support, social connections, business presentations, product selection, etc. Effectively, co-browsing allows one or more users to share an identical web-browsing experience.

While various co-browsing methods have been developed, many co-browsing systems provide limited capabilities. For example, many co-browsing systems fail to insure that every user's view of the web content being viewed between a viewer and a host remains the same throughout an entire co-browsing session. Moreover, many co-browsing systems only synchronize the page location (i.e., the URL) of the page that is intended to be shared. As co-browsing becomes more mainstream, co-browsing systems capable of offering more diverse co-browsing functionalities, such as supporting the automatic synchronization of a browser's entire state and content, including viewport experience, frames, portlets, form fields, controls, etc., may be needed. It is with these observations in mind, among others, that the various aspects of the present disclosure were developed.

SUMMARY

Aspects of the present disclosure include methods for enabling co-browsing. The method may be performed by a processor, such as a computing device. The method includes receiving guest data identifying one or more guest computing devices to participate in a co-browsing session with a host computing device. The method also includes activating injector code embedded within one or more websites displayed in a first web browser including a viewport on the host computing device, the injector code configured to generate a second web browser that captures the viewport. The method further includes transmitting the viewport to the one or more guest devices for display.

Aspects of the present disclosure include systems for enabling co-browsing. The system includes at least one processor. The system also includes a co-browser application comprising modules executable by the at least one processor. The modules include a graphical user interface module to receive guest data identifying one or more guest computing devices to participate in a co-browsing session with a host computing device. The modules also include a processing module to activate injector code embedded within one or more websites displayed in a first web browser including a viewport on a host computing device, the injector code configured to generate a second web browser that captures the viewport and transmits the viewport to the one or more guest devices for display.

Finally, aspects of the present disclosure include non-transitory computer readable mediums for enabling co-browsing. The non-transitory computer readable medium is encoded with a browser application comprising modules executable by a processor. The modules include a graphical user interface module to received guest data identifying one or more guest computing devices to participate in a co-browsing session with a host computing device. The modules also include a processing module to activate injector code embedded within one or more websites displayed in a first web browser including a viewport on a host computing device, the injector code configured to generate a second web browser that captures the viewport and transmits the viewport to the one or more guest devices for display.

BRIEF DESCRIPTION OF THE DRAWINGS

The foregoing and other objects, features, and advantages of the present disclosure set forth herein will be apparent from the following description of exemplary embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only exemplary embodiments of the present disclosure and, therefore, are not to be considered limiting in scope.

DETAILED DESCRIPTION

Aspects of the present disclosure enable co-browsing, or the sharing of a screen, displayed on a host computing device with one or more guest computing devices to enable a co-browsing experience. In various aspects, program code is integrated into the source code of one or more web pages. The program code may be a set of software instructions"

and/or modules that add functionalities and/or modify existing functionalities of the web page to enable co-browsing. In particular, the program code may be activated to implement a browser-within-a-browser on the host computing device that gathers, processes, analyzes, and/or otherwise captures browser information from both the host and guest computing device during a co-browsing session. Subsequently, the browser information may be provided to one or more guest computing devices and processed for display, thereby enabling a co-browsing experience between the one or more guest computing devices and the host computing device.

In other aspects, the disclosed systems may automatically record, in real-time, a web browsing session or co-browsing session for later retrieval and playback. More specifically, audio and visual events of a browsing session initiated or otherwise performed at the host computing device and/or the guest computing device may be recorded as an independent playback file, such as a video file. Metadata corresponding to the audio and/or visual events may be captured and automatically processed to generate the playback file. Any generated playback file may be re-played under the control of the guest computing device (or other device), which generates a graphical user-interface for controlling replay of the file. In some embodiments, the graphical user-interface includes a window for playing back the file.

Figure 1:
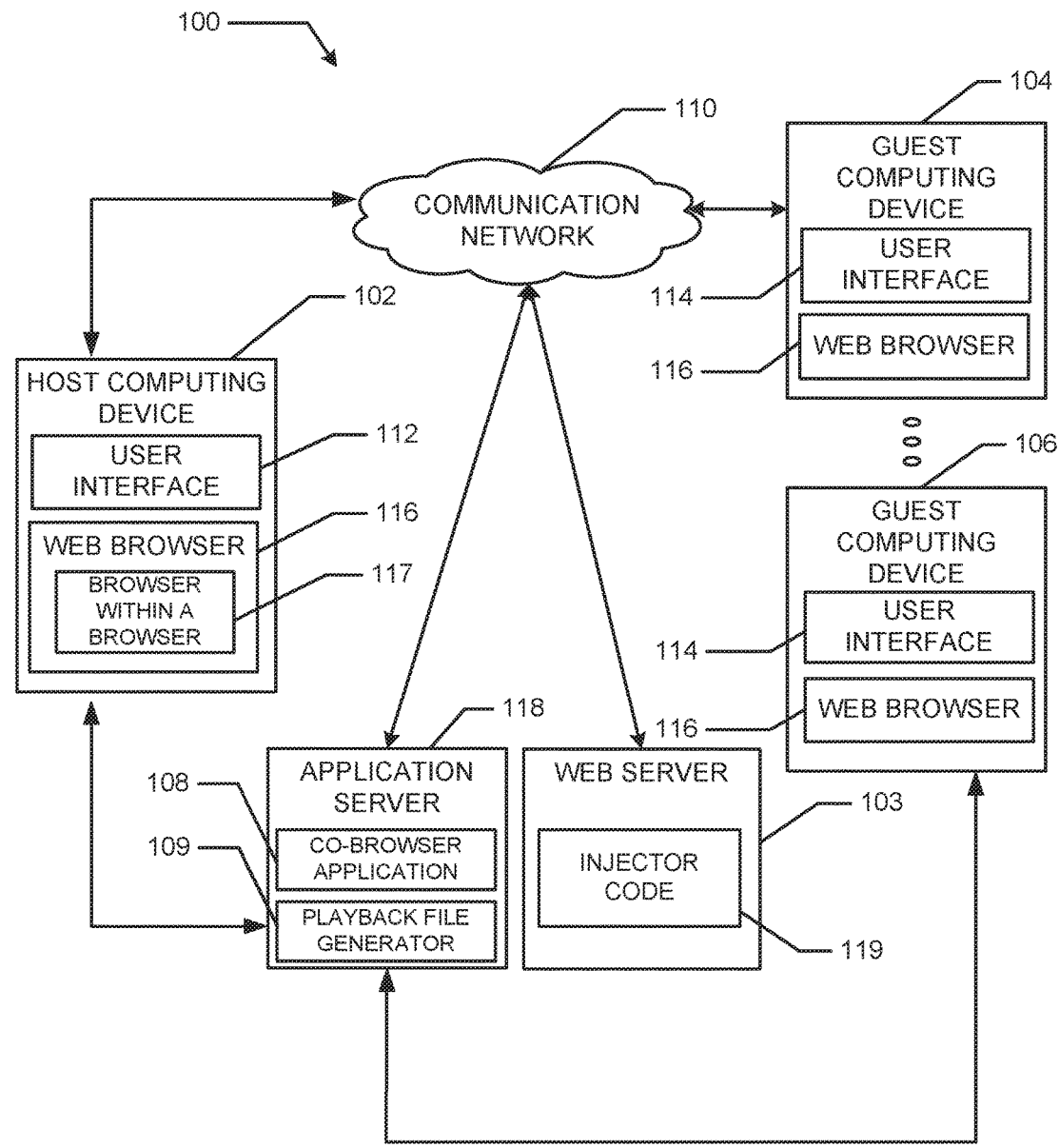
FIG. 1 is a block diagram illustrating a computing environment for enabling co-browsing, according to aspects of the present disclosure.

FIG. 1 illustrates an example computing environment 100 for co-browsing in accordance with aspects of the present disclosure. The computing environment 100 includes a host computing device 102 in communication with a web server system 103 and an application server 118. The computing environment 100 also includes guest computing devices 104-106 in communication with the application server 118 via a communication network 110. The communication network 110 can be the Internet, an intranet, a local area network, a wireless local network, a wide area network, or another communication network, as well as combinations of such networks. The guest computing devices 104-106 may transmit requests to and/or receive responses from the application server 118 to communicate with the host computing device 102 through the communication network 110 to enable co-browsing. Additionally, the host computing device 102 may transmit requests to and/or receive responses from both the web server 103 and the application server 118 to communicate with the guest computing devices 104-106.

The host computing device 102 and/or the guest computing devices 104-106 may be a personal computer, work station, server, mobile device, mobile phone, tablet device, processor, and/or other processing device. Each device may include one or more processors that process software or other machine-readable instructions and may include a memory to store the software or other machine-readable instructions and data. The memory may include volatile and/or non-volatile memory. Additionally, each device may also include a communication system to communicate via a wireline and/or wireless communication, such as through the Internet, an intranet, an Ethernet network, a wireline network, a wireless network, a mobile communications network, and/or another communication network. The host computing device 102 and/or the guest computing devices 104-106 may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, web forms, web application pages, and other data.

The host computing device 102 and/or the guest computing devices 104-106 may include a user-interface (UI) 112 and 114, respectively, to receive input from a user to enable co-browsing. UIs 112 and 114 may include a display (not shown) such as a computer monitor, liquid crystal display, for viewing data and/or input forms, and any combination of input/output devices (not shown), such as a keyboard or a pointing device (e.g., a mouse, trackball, pen, or touch pad), speaker, and/or any other type of device for receiving input to enable co-browsing.

The host computing device 102 may include a web browser 116, such as Microsoft Internet Explorer®, Mozilla Firefox®, Safari®, Google Chrome®, etc., capable of presenting various types of web content including web pages, images, audio, video, multimedia, and/or any combination thereof. In one particular embodiment, the web browser may be a Java-enabled browser and/or web browser capable of interpreting and/or otherwise processing Java® code and/or Javascript® code. While a browser capable of interpreting Java® code has been described, it is contemplated that any type of web browser capable of processing web content, such as web pages, may be included in the host computing device 102 and guest computing devices 104-106. The web browser 116 may be capable of executing, rendering, and/or otherwise initiating a browser within a browser 117 (i.e., a second browser within the web browser 116). The browser within a browser 117 may perform various web functions including the same functions capable of being performed by the web browser 116.

A user may access the UI 112 of the host computing device 102 to perform various web-related interactions, such as request web pages, web content, etc. In one particular embodiment, a user may access the UI 112 of the host computing device 102 to transmit a request to the application server 118 to initiate a co-browsing session or to transmit a web page navigation request to the web server 103, which may be a server and may include various software and/or hardware components for processing web page requests, such as HTTP requests, to access web pages using uniform resource locator(s) ("URL"). For example, the web server 103 may receive an HTTP request via a URL from the host computing device 102, and in response, provide a particular web page corresponding to the URL.

The application server 118 may be a server and may include various hardware and/or software components for processing web page or other communication requests, such as HTTP requests, to access web pages using URLs. The application server 118 may also receive various web-related requests from various devices (e.g. the guest computing devices 104-106), and may transmit web pages and/or web content to the devices in response to such requests. In one particular embodiment, the application server 118 may be the processing device used to initiate the co-browser application 108 to enable and subsequently manage a co-browsing session between the host computing device 102 and the various guest computing devices 104-106. In one embodiment, the application server 118 may further include a playback file generator 109 that processes visual data and audio data to generate files for playback at the host computing device 102 and/or the guest computing devices 104-106. In particular, the playback file generator 109 may generate a video file for playback.

Figure 2:
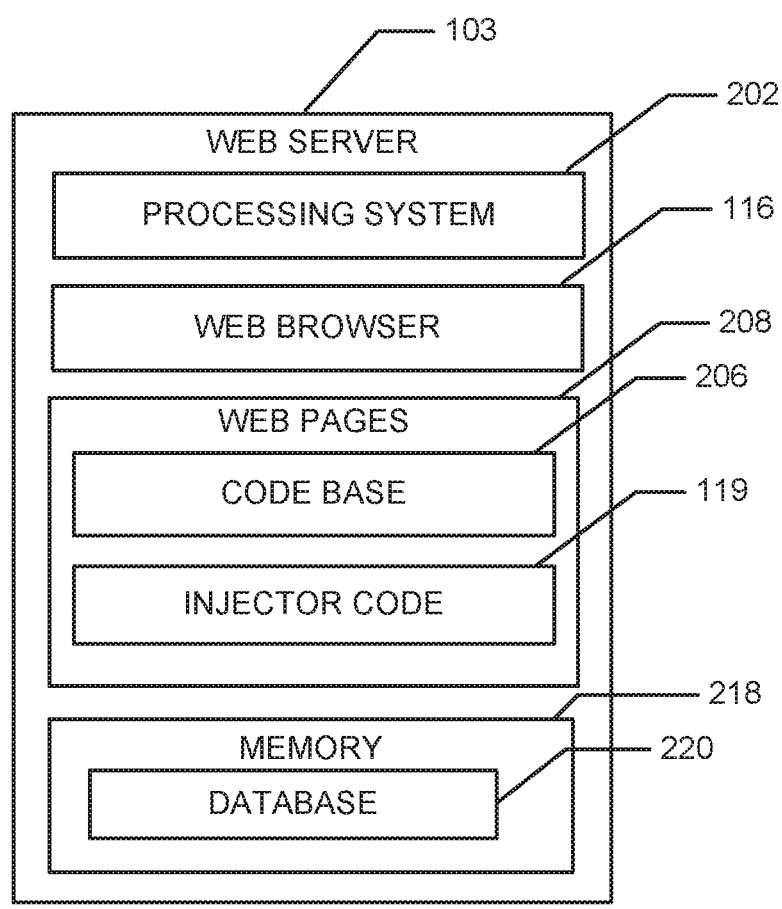
FIG. 2 is a block diagram illustrating a web server, according to aspects of the present disclosure.

FIG. 2 is an example block diagram illustrating the various hardware and/or software components of the web server 103 according to one exemplary embodiment of the present disclosure. The web server 103 may include a database 220. The database 220 may be a general repository of data including web pages, web page data, and webpage content and/or any other data or information related to providing web pages and/or web content, etc. The database 220 may include memory and one or more processors or processing systems to receive, process, query and transmit communications and store and retrieve such data. In another embodiment, the database 220 may be a database server.

The web server 103 may include a processor and/or processing system 202 that may be used to process web page requests, such as HTTP requests, and/or access web pages 208. A webpage is a document or information resource that may be accessed through a web browser and displayed on a monitor or mobile device. The information within the webpage may be in HTML or XHTML format, and may provide navigation to other web pages via hypertext links. For example, the web server 103 may receive an HTTP request for a particular webpage via a URL from the host computing device 102, and in response, provide a particular web page of the web pages 208 corresponding to the URL.

The web server 103 may include injector code 119, which may be a code, program code, script, module, applet, application, and/or any other type of executable code capable of being injected and/or otherwise embedded into a webpage, such as web pages 208. Once injected, the injector code 119 may be activated to generate a browser within a browser, such as the browser within a browser 117, and subsequently used to enable a co-browsing session.

In one embodiment, the injector code 119 may be used to track, record, and/or analyze various data statistics related to the web page. The type of data to be tracked by the injector code 119 and returned to the application server 118 in an anonymous fashion for both host and guest computing devices within a shared session may include, but is not limited to, user statistics on web page viewed, items clicked, time of page, time on site, mouse position, mouse movement, mouse speed, viewport dimensions, page scroll, GUI module 308 activities, co-browsing initiation, co-browsing suspension, co-browsing end, etc.

Figure 3:
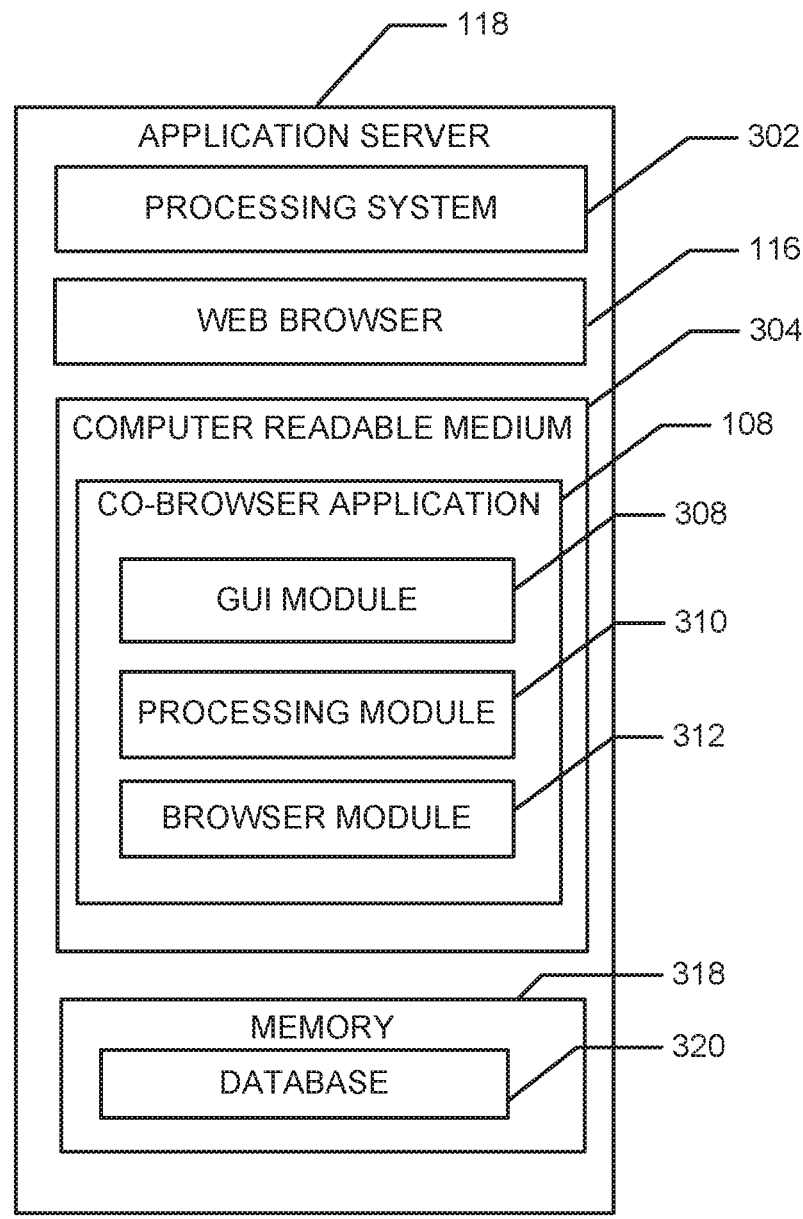
FIG. 3 is a block diagram illustrating an application server, according to aspects of the present disclosure.

FIG. 3 is an example block diagram illustrating the various hardware and/or software components of the application server 118 according to one exemplary embodiment of the present disclosure. The application server 118 may include a processor and/or processing system 302 that may be used to initiate the injector code 119 that enables co-browsing between the host computing device 102 and one or more guest computing devices 104-106. The processing system 302 may include memory and/or be in communication with a memory 318, which may include volatile and/or non-volatile memory and various other supporting computing components.

The application server 118 may include a database 320. The database 320 may be a general repository of data including web pages, web page data, and webpage content and/or any other data or information related to providing web pages and/or web content, etc. The database 320 may include memory and one or more processors or processing systems to receive, process, query and transmit communications and store and retrieve such data. In another embodiment, the database 320 may be a database server.

The application server 118 may include a computer readable medium ("CRM") 304, which may include computer storage media, communication media, and/or another available computer readable medium that can be accessed by the processing system 302. For example, CRM 304 may include non-transient computer storage media and communication media. By way of example and not limitation, computer storage media includes memory, volatile media, non-volatile media, removable media, and/or non-removable media implemented in a method or technology for storage of information, such as machine/computer readable/executable instructions, data structures, HTML files, executable script code, images, program modules, or other data. Communication media includes machine/computer readable/executable instructions, data structures, program modules, or other data.

The CRM 304 may store executable instructions to implement the co-browser application 108 and/or associated functions, processes, etc. Generally, program modules include routines, programs, instructions, objects, components, data structures, etc., that perform particular tasks or implement particular abstract data types. The processing system 302 of the application server 118 may launch, run, execute, interpret or otherwise perform the logical instructions and/or processes of the co-browser application 108 to enable co-browsing. For example, in one embodiment, the co-browser application may include a GUI module 308, a processing module 310, and a browser module 312 to enable co-browsing. Other modules may also be included.

A GUI module 308 may transmit instructions that may be processed and/or executed to display one or more input forms on the host computing device 102 to receive session initiation and/or login information. Subsequently, a user may interact with the one or more input forms to enter session initiation and/or login information, such as session expansion or instant messaging information. The session initiation and/or login information may include information identifying a particular user and the guest and/or guests invited to co-browse the web session with the user. Each web session associated with a particular user may be encoded in a markup language such as hypertext markup language ("HTML"), LaTex, Standard Generalized Markup Language ("SGML"), Extensible Markup Language ("XML"), etc. It is contemplated that any type of markup language may be used to encode and/or otherwise define the web page. For example, the configuration information may identify and be established by a business enterprise intending to enable co-browsing capabilities for its customers, and one or more web pages (or all) corresponding to the business enterprise, such as the business enterprise's home page, customer support page, etc.

In one particular embodiment, the session initiation and/or login information may include information that articulates the presentation of a web page component that may be integrated within one of the user's associated web pages, which when selected by a user may initiate the activation of program code and/or a script which has been injected and/or embedded within one or more of the web pages associated with the user. The session initiation and/or login information may identify the enterprise's authentication credentials or a specific type of selectable web component such as a button, form, link, icon, image, multimedia component, etc., and may define its size, shape, color, etc. For example, referring to the business enterprise example, the configuration information may indicate that the business enterprise user would like to integrate a button entitled "Start Co-Browsing Session" with selection functionality (e.g., a push button) on its home page in the lower right hand corner, which when selected (i.e., pushed by a user), may activate the injector code 119 to enable various co-browsing capabilities. In yet another embodiment, a pop-up window may appear on the business enterprise's home page indicating that a web page viewer of the enterprise's home page may start a co-browsing session.

A processing module 310 may process the session initiation and/or login information from the injector code 119 and insert additional code in the host computing device 102 web browser 116 to establish a browser within a browser 117 on the host computing device 102. Once the a browser within a browser session is established, all code delivered to the host computing device 102 from the web server 103 may be processed by the browser within a browser 117 code rather than the original web browser 116. However, the display of the browser within a browser 117 experience will remain within the original web browser 116.

Figure 7:
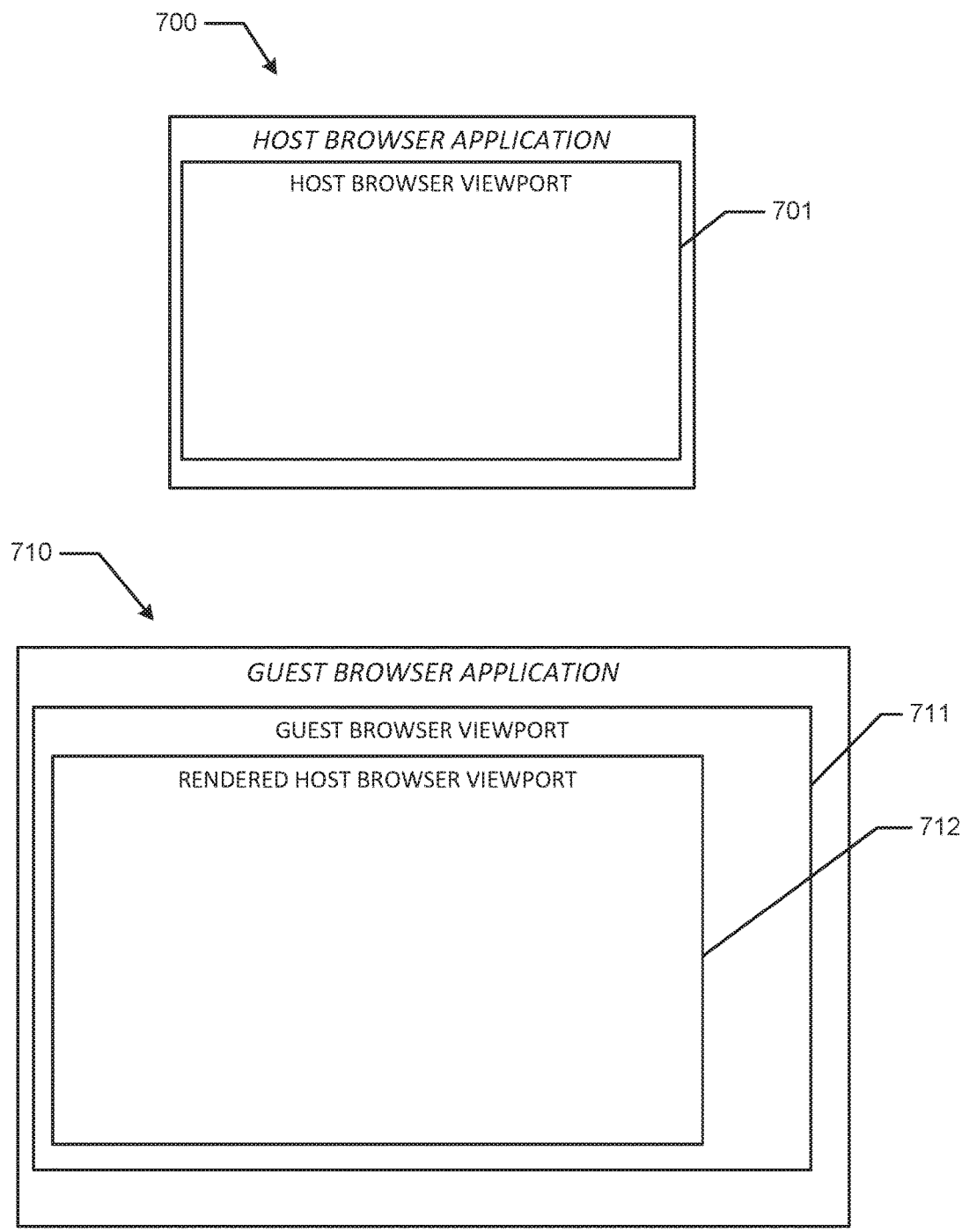
FIG. 7 is a block diagram illustrating viewport rendering, according to aspects of the present disclosure.

In one particular embodiment, when the browser within a browser 117 is activated, the web browser 116 renders the viewport of the host browser application (e.g. web browser 116). FIG. 7 is an example illustration for rendering viewports within a browser, according to aspects of the present disclosure. As shown, when the browser within a browser 117 is activated, a host browser viewport 701 of a host browser application 700 is rendered. The viewport 701 represents the actual display of information from a web server, such as web server 103, on the host computing device 102 and the actual visible area as rendered on the host computing device 102 within the web browser 116 post processing of the HTML from the web server 103. The viewport 701 may be transmitted to the application server 118 for sharing as an exact reproduction of the viewport 701 with the guest computing devices 104-106 via the rendered host browser viewport 712. During an active co-browsing session, the application server 118 will create a notification element on both host computing device 102 and guest computing devices 104-106 via GUI module 308.

Unlike co-browsing solutions that may only forward the HTML or document object model (DOM) or other content based co-browsing solutions of the web session, the host browser viewport 701 may be delivered and/or otherwise transmitted as a pixel-by-pixel rendering of the web page within the host browser application 700 via the web server 103 to the guest browser application 710. Subsequently the host browser viewport 701 may be displayed as the rendered host browser viewport 712, within the guest browser viewport 711 and according to the specifications of the host browser viewport 701, ensuring that the experience of the guest computing devices 104-106 mimics, mirrors, emulates, and/or is exactly the same as the experience of the host computing device 102, regardless of differences in the computing environments of the host computing device 102 and the guest computing devices 104-106.

Referring back to FIG. 2, a browser module 312 may transmit instructions that may be processed and/or executed to display one or more co-browsing input forms, such as an invitation window, on the host computing device 102 for initiating and/or otherwise hosting a co-browsing session. Specifically, the browser module 312 may activate the injector code 119 to generate one or more private communication rooms ("Room") at the application server 118. A Room may be generated on demand from executable code and represents all of the software components and/or infrastructure necessary to support communications, such as screen-sharing and/or co-browsing between the host computing device 102 and the one or more guest computing devices 104-106.

A Room represents a private communications channel enabling the host computing device 102 to transmit its viewport (e.g., viewport 701) and all other communications such as mouse position, mouse movement, page scrolling, page refresh, chat messages, privacy mode (when the host computing device 102 transmits a blackened or otherwise obscured version of its corresponding viewport 701 to the application server 118 instead of a live rendering of the viewport 701 to protect the privacy of the host computing device 102), a guest and session end (i.e., Room close) to and from both the application server 118 and guest computing devices 104-106.

The generated Room may be used by the browser module 312 to obtain or capture the viewport and/or any corresponding viewport information of the web browser 116 located on the host computing device 102. A viewport may be the total area within the web browser 116 that is visible on the host computing device 102. Viewport information may include font information, pixilation information, resolution information, web component coordinate information, and/or any other type of information related to rendering/displaying the web page on the host computing device 102 via the web browser 116. Accordingly, the browser module 312 may access the viewport of the web browser 116 on the host computing device 102 via a JavaScript (or other injectable programming code) browser within a browser that includes and/or otherwise wraps the viewport of the web browser 116, thereby obtaining access to the viewport rendering and control to all of the traditional functionalities of the web browser 116 in the form of a transparent browser within a browser 117. Access to traditional forward, back, reload commands in the browser within a browser 117 may either be provided via the GUI module 308 from the application server 118 or transparently passed to the web browser 116 on the host computing device 102 with content from web server 103 delivered in either case to the browser within a browser 117 while the co-browsing session is active.

Once a co-browsing session is established between the host computing device 102 and the one or more guest computing devices 104-106, the browser within a browser 117, the GUI module 308, and/or the web browser 116 may orchestrate the co-browsing session between the host computing device 102 and the one or more guest computing devices 104-106. In particular, the one or more guest computing devices 104-106 may continuously receive a rendered viewport of captured web pages, images, text, multimedia, and/or any other type of web page data such as mouse position, mouse movement, and/or scroll position from the host computing device 102 via the browser within a browser 117 and provide such data to the application server 118. Subsequently, the application server 118 may provide such web data to the one or more guest computing devices 104-106 for display, resulting in the one or more guest computing devices 104-106 viewing exactly what is displayed in the viewport of the host computing device 102. For example, in one particular embodiment, the guest computing devices 104-106 may continuously receive web page image data and screen coordinates corresponding to the web page image data for a portion of the display screen of the host computing device 102.

During an active co-browsing session, both the host computing device 102 and the guest computing devices 104-106 may have a visible status message indicating that the session is being shared; for the host computing device 102, the message may indicate that the host computing device 102 is sharing their web session, by for example displaying the names of the guests a user at the host computing device 102 invited. For the guest computing devices 104-106, the message may indicate that they are viewing a web session hosted by host user name. In some embodiments, on both the host computing device 102 and guest computing devices 104-106, the specific device user may have their mouse pointer labeled as "You" while their pointer is located over co-browsing content, and the mouse pointers of the other users may be labeled with each user's respective name as identified by the host computing device 102. Thus, the application server 118 facilitates communication between the host computing device 102 and the one or more guest computing devices 104-106 until the co-browsing session is terminated.

Either user (i.e., a guest user or host user) may terminate a co-browsing session by selecting an "end session" button, for example, in the transmitted image representations of the JavaScript browser window, or by closing the browser. In the case a guest terminates the co-browsing session, the co-browsing session will continue for the host and other guest(s). In the case when the guest terminating the co-browsing session is the last (or only) guest, the host will be informed that the guest terminated the co-browsing session and the Room will be closed. In the case the host terminates the co-browsing session, all guests may be immediately notified that the host terminated the co-browsing session and the Room will be closed. When a termination results in a Room being closed, the user who did not terminate the session may be provided with several options. For example, the user may be enabled to "re-invite" the terminated user back into a co-browsing session. When a Room is closed after a successful co-browsing termination, all of the program modules that were loaded into the memory 218 of the application server 118 will be destroyed. Additionally, all tracking data will be stored in the database 220 on the application server 118 and computing resources released for re-use. On the successful termination of a co-browsing session, the browser within a browser 117 on the host computing device 102 will be terminated and the web-browsing activities of the web browser 116 on the host computing device 102 will return to normal operations until another co-browsing session is initiated on a website with configured injector code 119.

Figure 4:
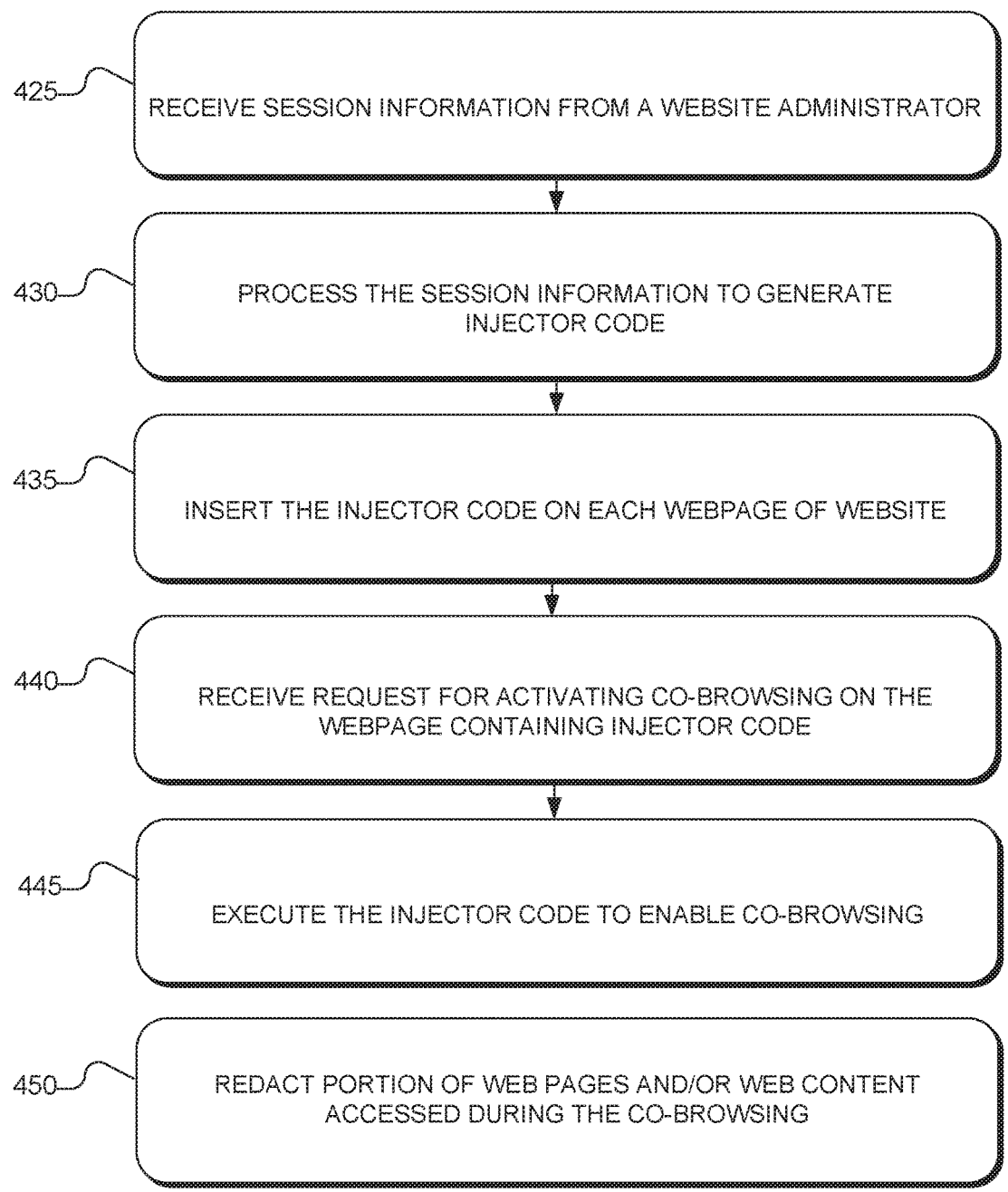
FIG. 4 is a flowchart illustrating an example processes for enabling co-browsing, according to aspects of the present disclosure.

FIG. 4 illustrates a method for enabling co-browsing in accordance with aspects of the present disclosure. At 425, process 400 includes receiving session initiation and/or login information from a user, such as a website administrator. The session initiation and/or login information may be processed to generate the injector code 119 that may be injected into one or more of the web pages associated with the website wanting to add co-browsing functionality identified in the configuration information at 430. At 435, the injector code 119 is inserted into and/or on all web pages of the website (or all of them that will support co-browsing functionality). At 440, a request is received for accessing a web page containing the injector code 119. For example, a user, using the host computing device 102, may enter a URL via the web browser 116 requesting access to a web page stored on the web server 103 that has been injected with the injector code 119. In response to the request, the web server 103 may transmit the requested web page to the host computing device 102. The web page includes the injector code 119 that may be activated to enable co-browsing functionality and may allow a user to activate the injector code 119 via a web component, such as a selectable "invite" button. The web server 103 transmits the requested web page to the host computing device for processing and display via the web browser 116 on the host computing device 102. Once a user selects the web component capable of initiating a co-browsing session displayed and/or otherwise provided on the requested web page, the web browser executes the program code to enable co-browsing at 445.

In some embodiments, at 450, the browser within a browser 117 may redact, or black out, blur, remove or otherwise obscure portions of the co-browsing session to prevent display of any visual information within the redacted portions. To do so, the application server 118 may maintain a list of DOM elements to redact with an associated redaction type or the website administrator may add a CSS class type to elements to redacted in the website code. To visualize the redaction, the browser within a browser 117 may access the DOM of the web pages and/or web content involved in the co-browsing session. In general, the DOM represents a tree-based data structure that describes the logical structure of the web page and the web content contained therein. When processing the duplicate copy of the DOM in the browser within a browser 117, as part of a co-browsing session, DOM elements that have either been tagged with the CSS class types provided to the website administrator or the DOM elements have been identified in the application server 118 configuration for the specific website; the content of the identified element will be changed (redacted, or blacked out, blurred, removed or otherwise obscured) in the DOM copy in the browser within a browser 117 before it is transmitted to the application server 118 and possibly shared with one or more guest computing device(s) 104-106.

Figure 5:
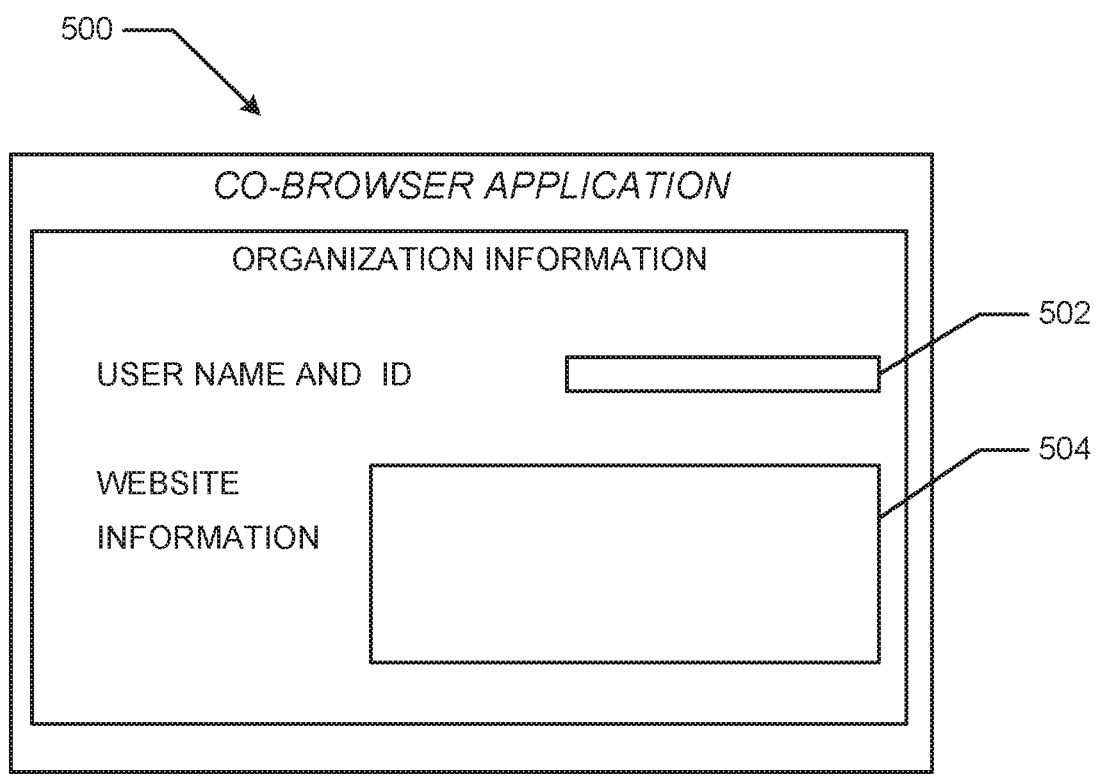
FIG. 5 is an example input form, according to aspects of the present disclosure.

FIG. 5 is an illustrative example of an input form 500 for entering configuration information. As illustrated, a user, such as a website administrator, may enter identification data, such as name in input field 502 and website data identifying a website that the user intends to enable co-browsing on associated with input field 504. Other configuration information may also be provided.

Figure 6:
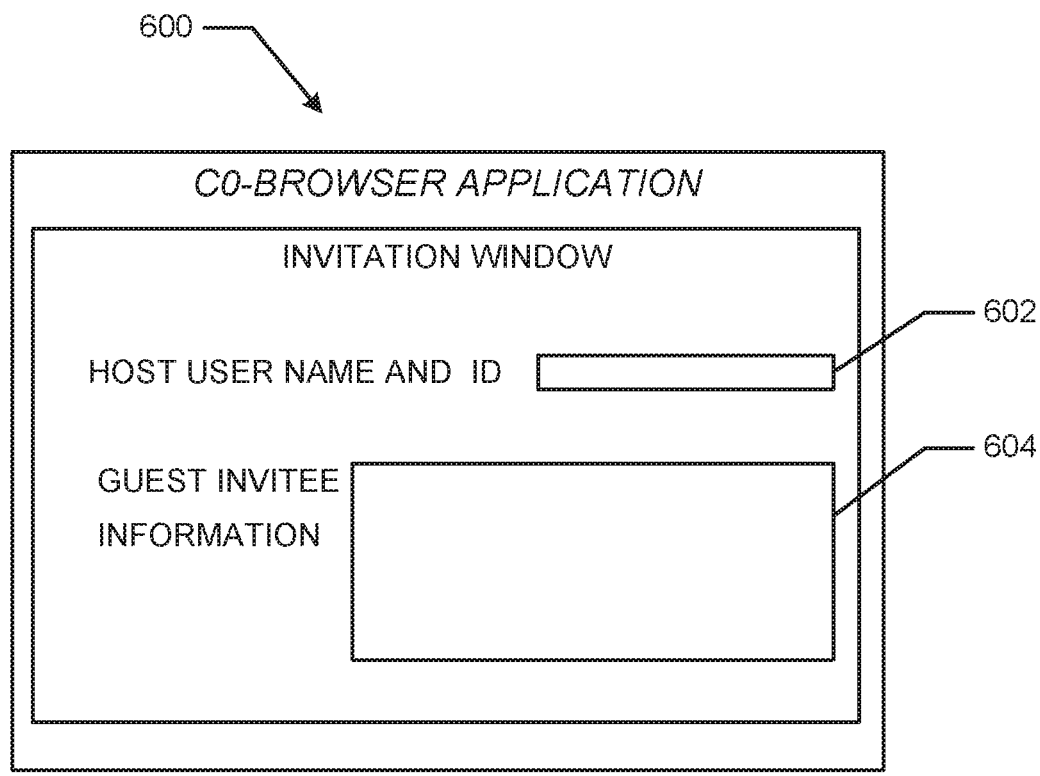
FIG. 6 is another example of an input form, according to aspects of the present disclosure.

FIG. 6 is an illustrative example of another input form 600 for entering identification data and guest data. As shown, the co-browsing input form 600 may receive identification data identifying the user at the host computing device 102 at input field 602 and guest data identifying one or more guest computing devices 104-106 that the identified user wants to share with or otherwise invite to the co-browsing session at input field 604. The browser module 312 may process the guest data to establish the co-browsing session with one or more guests.

Figure 8:
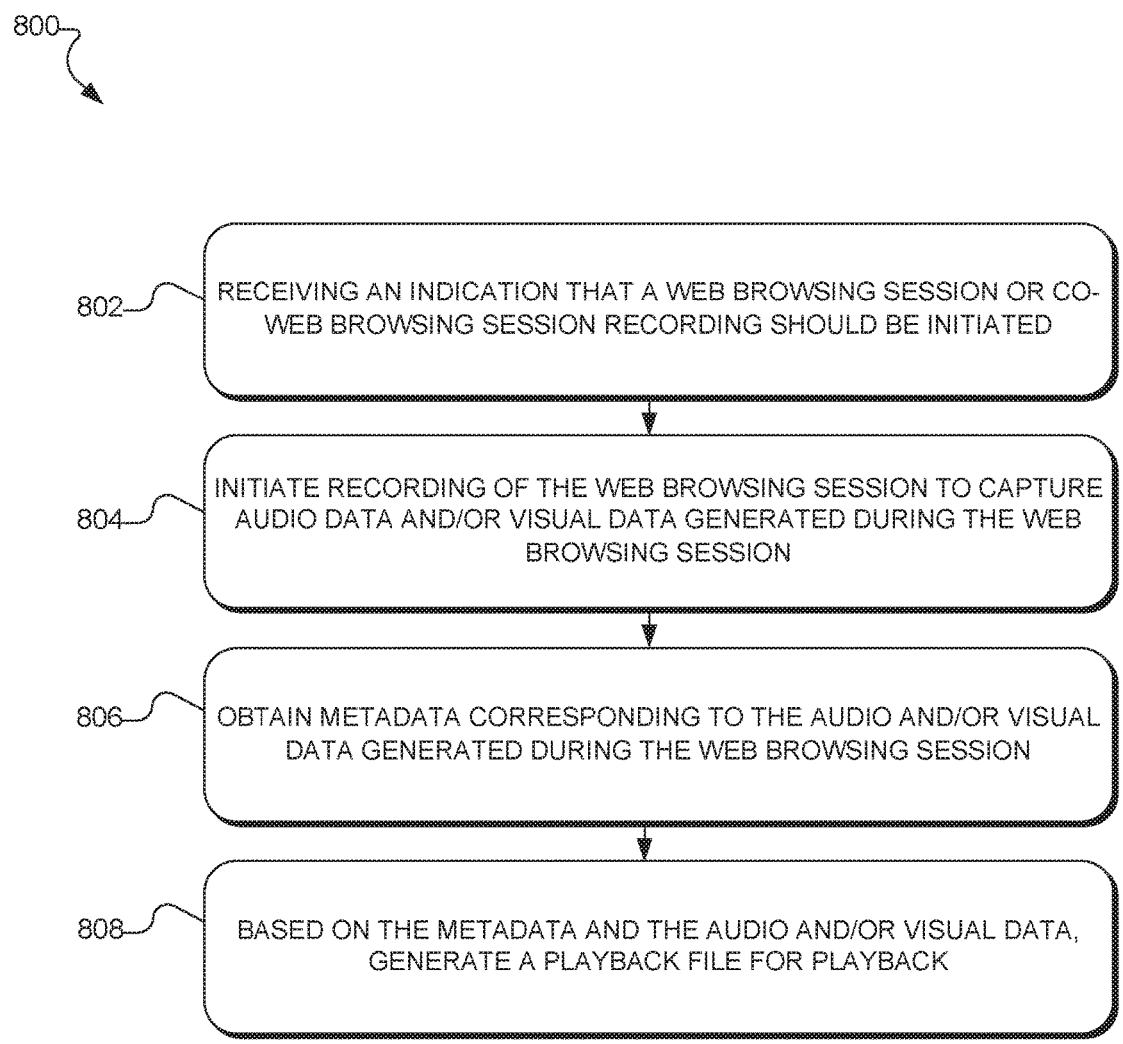
FIG. 8 is a flowchart illustrating an example processes for recording a browsing and/or co-browsing session, according to aspects of the present disclosure.

FIG. 8 illustrates an example method and/or process 800 for recording a browsing session and/or co-browsing session, according to aspects of the present disclosure. As illustrated at 802, the process begins with receiving an indication (e.g., a message) from the host computing device 102 signaling that a web browsing or co-browsing session recording should be initiated. For example, the application server 118 may receive an indication from the host computing device 102 that a co-browsing session should be recorded. In other embodiments, the recording may be initiated automatically at the start of each co-browsing session. In response to such an indication, at 804, a recording process is automatically initiated that captures, on a real-time basis, audio data, visual data, and/or any other data generated by or otherwise associated with the web browsing session or a co-browsing session, such as every keystroke, mouse point, click point, click, hyperlink selection, web page selection, images, and/or the like, performed during the browsing.

In some embodiments, the recorded web browsing or co-browsing session may be event driven. More specifically, the indications received at the server may be processed and identified as a start record event, audio data event, visual data event, and/or stop record event. The indications received at the server may be automatically logged in a database and timestamped, along with any audio and/or visual components recorded during the live browsing session.

A start record event causes the application server 118 to initiate recording of the web browsing session and/or co-browsing session and store in an event log data identifying the particular web browsing or co-browsing session being recorded, its start time, location, etc. For example, when a start event is identified from the processed indication, the application server 118 initializes the recording a co-browsing session occurring at the host computing device 102 and/or the guest-computing devices 104-106 and stores a start time in a log file. In some embodiments, there may be more than one computing device (e.g., host computing device or guest computing device) recording a web browsing or co-browsing session. For example, when the host computing device 110 is recording a web-browsing session and there is one or more guest computing devices 104-106 connected to the same co-browsing session, any meta data generated by either the host computing device 110 or the guest computing devices 104-106 will be collected and logged by the server. In such a scenario, the server may verify that the encountered start record event is the correct start record event for the desired recording. Once verified, the server proceeds to create the playback file. A stop record event causes the application server 118 to stop the recording of the web browsing session and/or co-browsing session.

A visual data event causes the server to record any visual data (i.e., a series of related or unrelated still frames, web-pages rendered as images) or other multimedia currently occurring within the web browsing session or co-browsing session in a data file. For example, the server may detect real-time visual data changes of an active web browsing session or co-browsing session occurring at the host browser viewport 701 or the guest browser viewport 712 of the host browser computing device 102, such as rendering an HTML document, mouse pointer movement, link activation, multimedia manipulation, etc., and automatically capture an image or series of images of the changes. The server may automatically write or otherwise store the captured images an entry as a visual data event corresponding to the change in a data file, database or other type of storage.

An audio event causes the server to record any audio data currently occurring within the web browsing or co-browsing session to be recorded in an audio file. For example, the application server 118 may detect real-time audio data changes corresponding to various visual data events that may occur during the web browsing or co-browsing session, such as rendering an HTML document, mouse pointer movement, link activation, multimedia manipulation, etc., and automatically capture an image or series of images of the browser (e.g., an image of the viewport) and the audio data associated with each captured image or series of images. The application server 118 may automatically write or otherwise store the captured images and its corresponding metadata in a database. In some embodiments, the audio data may not be recorded as separate data and thus the audio may be recorded or otherwise captured with the visual data and/or visual data events. In other embodiments, no audio may be captured during the recording of the web-browsing or co-browsing session. Rather, audio may be subsequently added and/or otherwise annotated to the recording of the web-browsing or co-browsing session to enhance the recorded of the web-browsing or co-browsing session. For example, a recorded web-browsing or co-browsing session may be enhanced with an audio narration describing the events that occurred during the recorded web-browsing session or co-browsing session. The audio may be added with real-time correlation between the recorded audio and the various events occurring during the web browsing session or co-browsing session.

Referring back to FIG. 8, at 806, during the recording of the web browsing or co-browsing session, metadata corresponding to each recorded audio data event and/or visual data event may be captured. For example, the playback file generator 109 of the application server 118 may automatically capture metadata. In one particular embodiment, the metadata identifies changes to the viewport (e.g. viewport 701, 712) of the host computing device 102 and/or the guest computing devices 104-106 that occur during the recording of the web browsing or co-browsing session. Since the view port represents the virtual area used by the browser render to determine how content is scaled and sized when rendered on a screen, metadata corresponding to changes occurring at the viewport may be captured by the server and subsequently used to identify changes in any audio data and/or visual data occurring at the viewport and during the web browsing or co-browsing session. Events that will trigger a viewport snapshot or URL capture include, page load, page scroll, form entry, viewport resize, document share or any other user activity in the host computing device 102 that mutates the DOM of the session. The data collected will include a timestamp to facilitate session recreation. Session metadata such as mouse position, mouse click, in-session annotation, etc. is captured from both the host computing device 102 and any guest computing devices 104-106 and also include a timestamp to facilitate session recreation.

Figure 9:
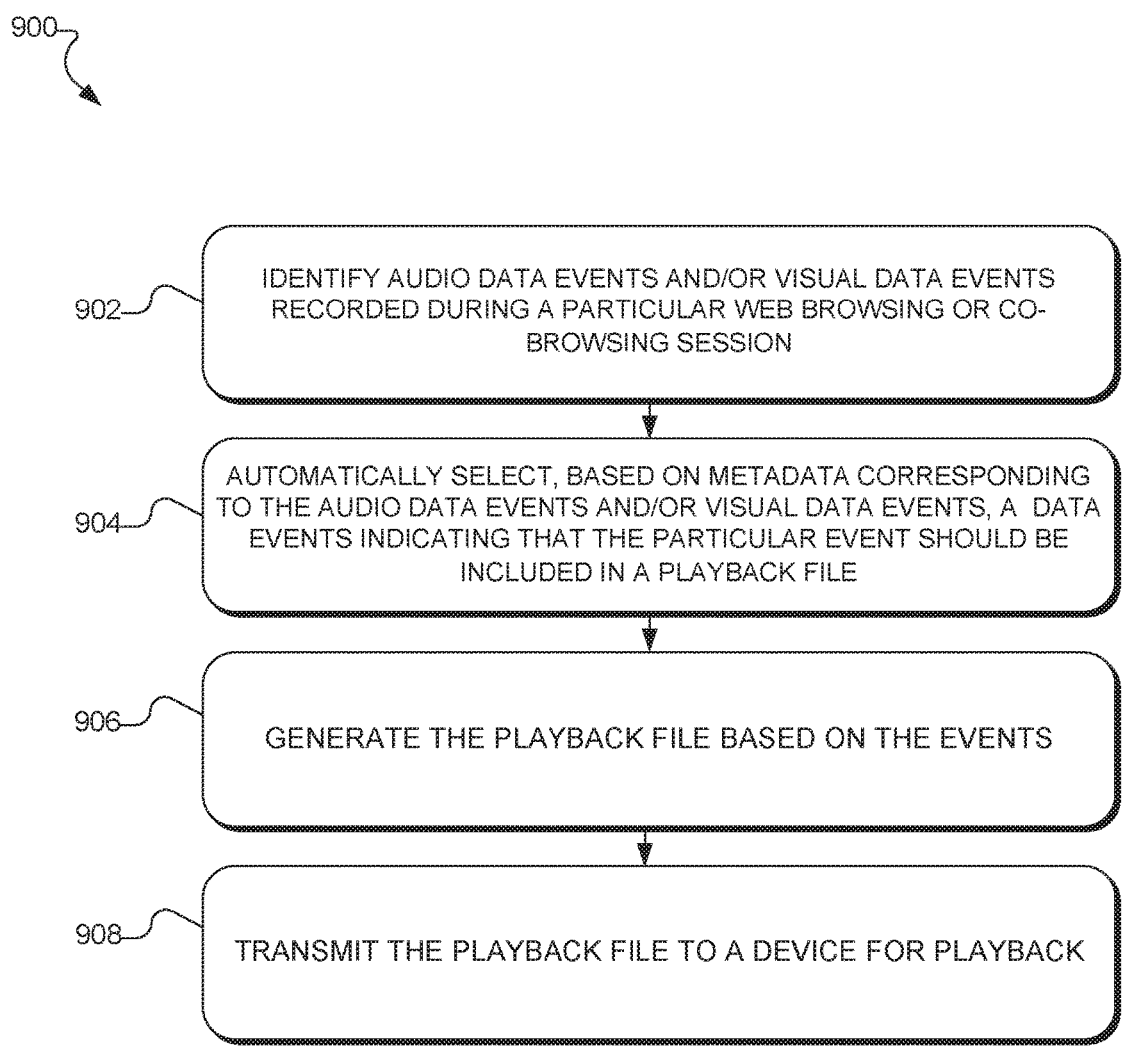
FIG. 9 is a flowchart illustrating an example processes for generating a playback file, according to aspects of the present disclosure.

Referring again to FIG. 3, once all of the web browsing session is recorded and any metadata is captured, the server can either automatically or on-demand generate a playback file containing all of the audio data and/or visual data that may be played back at the host computing device, guest computing device, or elsewhere, at 808. In one embodiment, the playback file generator 109 of the application server 118 automatically merges audio data events and visual data events into a video file for playback and creates a file containing the timestamps with the URL of the website being browsed in the video playback frame accurate to the milli-second. FIG. 9 illustrates a process for merging audio data events and/or visual data events into a playback file such as a video file, according to one embodiment. As illustrated, at 902, the server identifies the audio and visual data events recorded during a particular web browsing or co-browsing session. Next, at 904, metadata captured during the recording of the web browsing or co-browsing session that corresponds to the audio and/or visual data events is processed to automatically select the visual data and/or audio data where changes in the web browsing or co-browsing session where detected, indicating that the visual data event and/or audio data event corresponding to the changes should be merged or otherwise included into the video file.

An illustrative example of identifying visual data events for inclusion into the video file will now be provided. Assume a recording of a co-browsing session included a plurality of visual data events. Stated differently, by recording the web browsing or co-browsing session images and/or image frame data was captured by the application server 118. In the present example, assume the visual data events equate to the recording of a series of seven images, although it is contemplated that many more images—in the thousands or hundreds of thousands—may be recorded. Additionally, metadata corresponding to each of the seven images was captured, wherein the metadata signifies the type of visual data recorded (i.e., that it was an image), the change (if any) occurring or otherwise identified at the particular image, and the like.

To select the visual data events for inclusion into the playback file (e.g., a video file) the application server 118 processes the metadata for each captured visual data event and/or audio data event. Thus, in the example above, for each of the seven images captured, the corresponding metadata was processed to see if a change occurred. If a change was identified, the image was selected for merging into the video file. Any images with metadata showing no changes represent duplicates of previously recorded images and thus are not included into the merged video file. Eliminating duplicate frames ensures that the generated video file is significantly smaller in size than when including all of the recorded visual data events (e.g., images) to generate the video file. For example, a normal size of a 1 minute video file is around 44 meg. Generating a video file according to the methodology described in FIG. 9 may result in the generation video files of much smaller size, such as 1.5 meg per minute of video.

Referring to FIG. 9, at 906, the selected visual data events and/or audio data events that correspond to changes in the web browsing session are transformed into a video stream that is suitable for delivery over a display medium, such as TV, cable TV, computer displays, wireless display devices, etc. In one embodiment, selecting the visual and/or audio data where changes occur allows for easy integration with the Motion Pictures Expert Group ("MPEG") compression algorithms. Generally speaking, MPEG algorithms compress data to form small bits that can be easily transmitted and then decompressed. MPEG achieves its high compression rate by storing only the changes from one frame to another, instead of each entire frame. Thus, the metadata identifying changes in the web browsing experience can be used to select the visual data events used to generate an MPEG video file.

Figure 10:
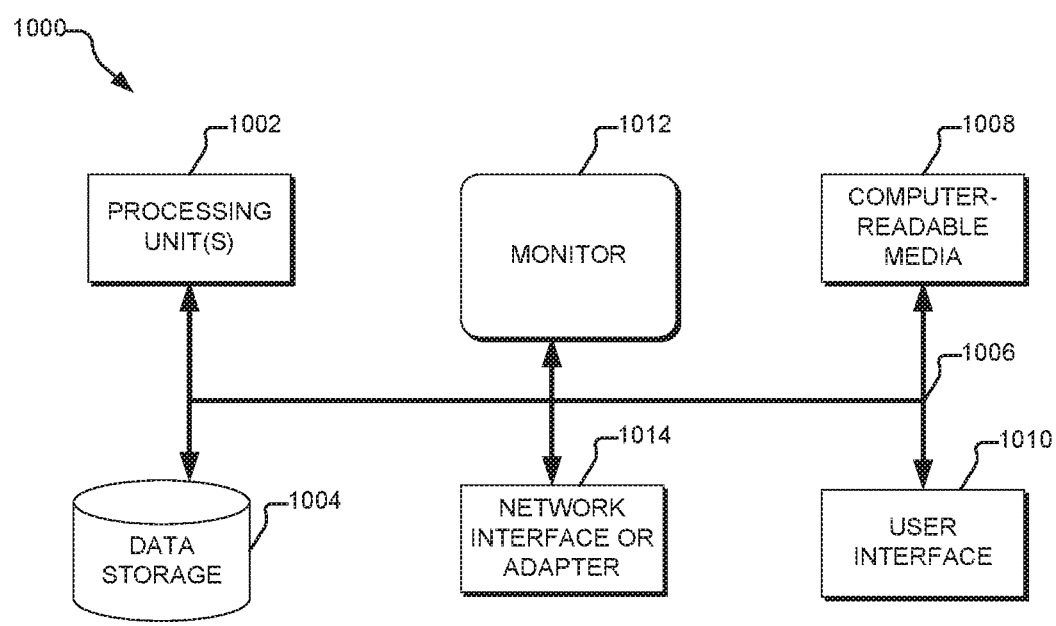
FIG. 10 is a block diagram illustrating a computing device, according to aspects of the present disclosure.

FIG. 10 illustrates an example of a suitable computing and networking environment 800 that may be used to implement various aspects of the present disclosure described in FIGS. 1-2, such as the intelligent recommendation system 102. As illustrated, the computing and networking environment 1000 includes a general purpose computing device 1000, although it is contemplated that the networking environment 1000 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 1000 may include various hardware components, such as a processing unit 1002, a data storage 1004 (e.g., a system memory), and a system bus 1006 that couples various system components of the computer 1000 to the processing unit 1002. The system bus 1006 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1000 may further include a variety of computer-readable media 1008 that includes removable/non-removable media and volatile/nonvolatile media, but excludes transitory propagated signals. Computer-readable media 1008 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 1000. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 1004 includes computer storage media in the form of volatile/nonvolatile memory such as read only memory (ROM) and random access memory (RAM). A basic input/output system (BIOS), containing the basic routines that help to transfer information between elements within the computer 1000 (e.g., during start-up) is typically stored in ROM. RAM typically contains data and/or program modules that are immediately accessible to and/or presently being operated on by processing unit 1002. For example, in one embodiment, data storage 1004 holds an operating system, application programs, and other program modules and program data.

Data storage 1004 may also include other removable/non-removable, volatile/nonvolatile computer storage media. For example, data storage 1004 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 10, provide storage of computer-readable instructions, data structures, program modules and other data for the computer 1000.

A user may enter commands and information through a user interface 1010 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 1002 through a user interface 1010 that is coupled to the system bus 1006, but may be connected by other interface and bus structures, such as a parallel port, game port or a universal serial bus (USB). A monitor 1012 or other type of display device is also connected to the system bus 1006 via an interface, such as a video interface. The monitor 1012 may also be integrated with a touch-screen panel or the like.

The computer 1000 may operate in a networked or cloud-computing environment using logical connections of a network interface or adapter 1014 to one or more remote devices, such as a remote computer. The remote computer may be a personal computer, a server, a router, a network PC, a peer device or other common network node, and typically includes many or all of the elements described above relative to the computer 1000. The logical connections depicted in FIG. 10 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 1000 may be connected to a public and/or private network through the network interface or adapter 1014. In such embodiments, a modem or other means for establishing communications over the network is connected to the system bus 1006 via the network interface or adapter 1014 or other appropriate mechanism. A wireless networking component including an interface and antenna may be coupled through a suitable device such as an access point or peer computer to a network. In a networked environment, program modules depicted relative to the computer 1000, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for enabling co-browsing comprising:
   receiving, using at least one processor, guest data identifying one or more guest computing devices to participate in a co-browsing session with a host computing device;
   activating, using the at least one processor, injector code embedded within one or more websites displayed in a first web browser including a viewport on the host computing device, the injector code generating a second web browser that captures the viewport;
   tagging at least one object included in a document object model of the one or more websites;
   redacting content of the at least one object during the processing of the document object model based on the tagging;
   transmitting the viewport to the one or more guest devices for display;
   recording, using the at least one processor, and upon processing an indication from the host device that the co-browsing session should be recorded based upon a start record event, the viewport and metadata generated by the host device and the one or more guest computing devices and corresponding to a plurality of at least one of audio or visual data events occurring at the viewport at the host device and the one or more guest computing devices during the co-browsing session, wherein the changes to the viewport that occur during the recording are captured as data and timestamped;
   stopping the recording of the co-browsing session, using the at least one processor and upon processing an indication from the host device based upon a stop record event; and
   merging the captured data from the at least one of audio or visual data events and generating, using the at least one processor, a single playback file based on the plurality of at least one of audio or visual data events and the metadata.

2. The method of claim 1, wherein the generating the second web browser comprises injecting the second web browser into the first web browser.

3. The method of claim 1, further comprising:
   identifying, using the at least one processor, one or more websites for initiating a co-browsing session at the host computing device;
   generating injector code necessary to support the co-browsing session; and
   inserting the injector code into at least one website of the one or more websites participating in the co-browsing session.

4. The method of claim 1, wherein the viewport comprises the total visible area within the first web browser.

5. The method of claim 1, further comprising terminating the co-browsing session.

6. A non-transitory computer readable medium encoded with instructions for enabling co-browsing, the instructions which when executed by a processor, cause the processor to perform operations, comprising:
   receiving guest data identifying one or more guest computing devices to participate in a co-browsing session with a host computing device;
   activating injector code embedded within one or more websites displayed in a first web browser including a viewport on the host computing device, the injector code generating a second web browser that captures the viewport;
   tagging at least one object included in a document object model of the one or more websites;
   redacting content of the at least one object during the processing of the document object model based on the tagging;
   transmitting the viewport to the one or more guest devices for display;
   recording, upon processing an indication from the host device that the co-browsing session should be recorded based upon a start record event, the viewport and metadata generated by one of the host device and the one or more guest computing devices and corresponding to a plurality of at least one of audio or visual data events occurring at the viewport at the host device and the one or more guest computing devices during the co-browsing session, wherein the changes to the viewport that occur during the recording are captured as data and timestamped;

stopping the recording of the co-browsing session, upon processing an indication from the host device based upon a stop record event; and merging the captured data from the at least one of audio or visual data events and generating a single playback file based on the plurality of the at least one of audio or visual data events and the metadata.

7. The non-transitory computer readable medium of claim 6, wherein the generating the second web browser comprises injecting the second web browser into the first web browser.

8. The non-transitory computer readable medium of claim 6, the operations further comprising:
identifying, using the at least one processor, one or more websites for initiating a co-browsing session at the host computing device;
generating injector code necessary to support the co-browsing session; and
inserting the injector code into at least one website of the one or more websites participating in the co-browsing session.

9. The non-transitory computer readable medium of claim 6, wherein the viewport comprises the total visible area within the first web browser.

10. The non-transitory computer readable medium of claim 6, the operations further comprising terminating the co-browsing session.

11. A system for enabling co-browsing comprising: a memory comprising computer-executable instructions; and
a computing device comprising at least one processor to execute the computer-executable instructions to:
receive guest data identifying one or more guest computing devices to participate in a co-browsing session with a host computing device;
activate injector code embedded within one or more websites displayed in a first web browser including a viewport on the host computing device, the injector code generating a second web browser that captures the viewport;
tag at least one object included in a document object model of the one or more websites;
redact content of the at least one object during the processing of the document object model based on the tagging;
transmit the viewport to the one or more guest devices for display;
record upon processing an indication from the host device that the co-browsing session should be recorded based upon a start record event, the viewport and metadata generated by one of the host device and the one or more guest computing devices and corresponding to a plurality of at least one of audio or visual data events occurring at the viewport at the host device and the one or more guest computing devices during the co-browsing session, wherein the changes to the viewport that occur during the recording are captured as data and timestamped;
stop the recording of the co-browsing session, upon processing an indication from the host device based upon a stop record event; and
merge the captured data from the at least one of audio or visual data events and generate a single playback file based on the plurality of the at least one of audio or visual data events and the metadata.

12. The system of claim 11, wherein generating the second web browser comprises injecting the second web browser into the first web browser.

13. The system of claim 11, the computing device further to: identify one or more websites for initiating a co-browsing session at the host computing device;
generate injector code necessary to support the co-browsing session; and insert the injector code into at least one website of the one or more websites participating in the co-browsing session.

14. The system of claim 11, wherein the viewport comprises the total visible area within the first web browser.

15. The system of claim 11, the computing device further to terminate the co-browsing session.

* * * * *